US012617021B2

(12) United States Patent
Best

(10) Patent No.: US 12,617,021 B2
(45) Date of Patent: May 5, 2026

(54) Y-AXIS PARTING ADAPTOR FOR A CUTTING TOOL

(71) Applicant: ISCAR, LTD., Tefen (IL)

(72) Inventor: Dolev Best, Nahariya (IL)

(73) Assignee: Iscar, Ltd., Tefen (IL)

( * ) Notice: Subject to any disclaimer, the term of this patent is extended or adjusted under 35 U.S.C. 154(b) by 656 days.

(21) Appl. No.: 18/059,123

(22) Filed: Nov. 28, 2022

(65) Prior Publication Data

US 2023/0087684 A1 Mar. 23, 2023

Related U.S. Application Data

(63) Continuation of application No. PCT/IL2021/050772, filed on Jun. 24, 2021.

(Continued)

(51) Int. Cl.
*B23B 27/04* (2006.01)
*B23B 27/00* (2006.01)
(Continued)

(52) U.S. Cl.
CPC ............ *B23B 27/04* (2013.01); *B23B 27/002* (2013.01); *B23B 27/086* (2013.01); *B23B 29/043* (2013.01); *B23B 29/04* (2013.01)

(58) Field of Classification Search
CPC . B23B 27/04; B23B 2327/002; B23B 27/086; B23B 29/043; B23B 29/04; B23B 29/046
See application file for complete search history.

(56) References Cited

U.S. PATENT DOCUMENTS 4,332,513 A * 6/1982 Gowanlock ............. B23B 27/04
407/120
4,938,641 A * 7/1990 Maier ..................... B23B 27/04
407/66
(Continued)

FOREIGN PATENT DOCUMENTS

DE 4028361 A * 3/1991
DE 102012111240 A1 * 5/2014 ........... B23B 27/045
(Continued)

OTHER PUBLICATIONS

Brochure, "Parting Off in the Y-Axis, Efficient parting off in turn-mill centers with high cutting parameters," Paul Horn GmbH, 2019 (8 pp).
(Continued)

*Primary Examiner* — Sara Addisu
(74) *Attorney, Agent, or Firm* — Womble Bond Dickinson (US) LLP

(57) ABSTRACT

A cutting tool assembly having a longitudinal axis establishing upward and downward directions, includes a Y-axis parting adaptor mounted onto a holder. The parting adaptor has an insert pocket including a base jaw configured to support a cutting insert. The holder has a holder head portion and a shank portion. The holder head portion has an adaptor pocket in which the parting adaptor is mounted. If the holder shank cross-sectional shape is square or rectangular the forwardmost cutting edge is directly above the forwardmost holder shank surface, and if the holder shank cross-sectional shape is round and a centrally extending holder shank axis extends to the forwardmost cutting edge.

19 Claims, 3 Drawing Sheets

Related U.S. Application Data

(60) Provisional application No. 63/050,936, filed on Jul. 13, 2020.

(51) Int. Cl.
  B23B 27/08 (2006.01)
  B23B 29/04 (2006.01)

(56) References Cited

U.S. PATENT DOCUMENTS

| | | | | |
|---|---|---|---|---|
| 5,112,164 | A * | 5/1992 | Pano | B23B 27/04 |
| | | | | 82/160 |
| 5,288,180 | A * | 2/1994 | Hedlund | B23B 27/04 |
| | | | | 407/101 |
| 5,709,508 | A * | 1/1998 | Barazani | B23B 27/10 |
| | | | | 407/112 |
| 6,186,704 | B1 * | 2/2001 | Hale | B23B 29/043 |
| | | | | 407/107 |
| 6,270,294 | B1 * | 8/2001 | Sjoo | B23B 27/045 |
| | | | | 407/101 |
| 7,246,974 | B2 * | 7/2007 | Hansson | B23B 27/04 |
| | | | | 409/107 |
| 10,029,312 | B2 | 7/2018 | Thelin et al. | |
| 10,906,106 | B2 | 2/2021 | Hecht et al. | |
| 11,872,638 | B2 * | 1/2024 | Hecht | B23B 27/04 |
| 11,897,038 | B2 * | 2/2024 | Hecht | B23B 29/043 |
| 11,998,994 | B2 * | 6/2024 | Miyazawa | B23B 29/043 |
| 12,275,069 | B2 * | 4/2025 | Hecht | B23B 29/043 |
| 2005/0180824 | A1 * | 8/2005 | Hansson | B23B 29/043 |
| | | | | 407/110 |
| 2006/0257217 | A1 | 11/2006 | Berminge | |
| 2007/0110526 | A1 * | 5/2007 | Nicholas | B23B 27/08 |
| | | | | 407/113 |
| 2008/0003068 | A1 * | 1/2008 | Nagaya | B23B 29/043 |
| | | | | 407/110 |
| 2019/0176244 | A1 * | 6/2019 | Harouche | B23B 29/043 |
| 2019/0240741 | A1 | 8/2019 | Hecht et al. | |
| 2019/0358710 | A1 * | 11/2019 | Lundstrom | B23B 29/043 |
| 2020/0009757 | A1 | 1/2020 | Lundstrom et al. | |
| 2020/0324344 | A1 | 10/2020 | Thelin et al. | |
| 2022/0143714 | A1 * | 5/2022 | Muranishi | B23B 27/1611 |
| 2022/0258251 | A1 * | 8/2022 | Wu | B23B 27/002 |
| 2023/0121524 | A1 * | 4/2023 | Hecht | B23B 29/043 |
| | | | | 407/66 |
| 2023/0373011 | A1 * | 11/2023 | Erlich | B23B 29/043 |
| 2024/0278329 | A1 * | 8/2024 | Suzuki | B23B 27/04 |

FOREIGN PATENT DOCUMENTS

| | | | | | |
|---|---|---|---|---|---|
| EP | | 3219421 | A1 * | 9/2017 | B23B 27/1677 |
| WO | WO-2005084947 | A1 * | 9/2005 | | B23B 27/10 |
| WO | WO-2016121663 | A1 * | 8/2016 | | B23B 27/16 |
| WO | WO-2019102461 | A1 * | 5/2019 | | B23B 29/20 |

OTHER PUBLICATIONS

Brochure, "Y-axis Parting, Parting-off takes a new direction," Sandvik Coromant, 2017 (2 pp).

International Search Report issued Oct. 13, 2021, in PCT/IL2021/050772.

Written Opinion issued Oct. 13, 2021, in PCT/IL2021/050772.

Office Action issued Jul. 9, 2025 in Chinese counterpart Application No. 202180049065.3.

* cited by examiner

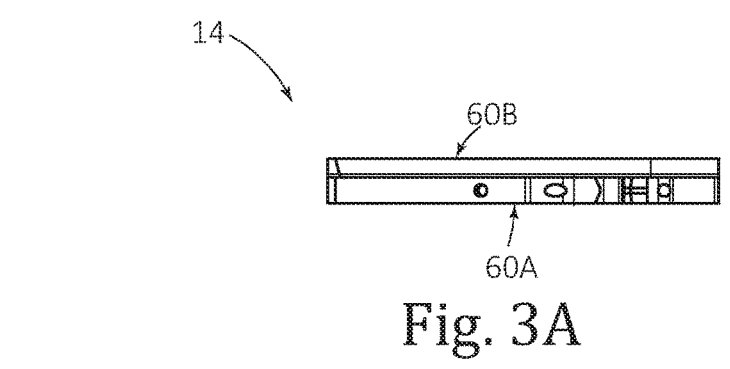
Fig. 3A
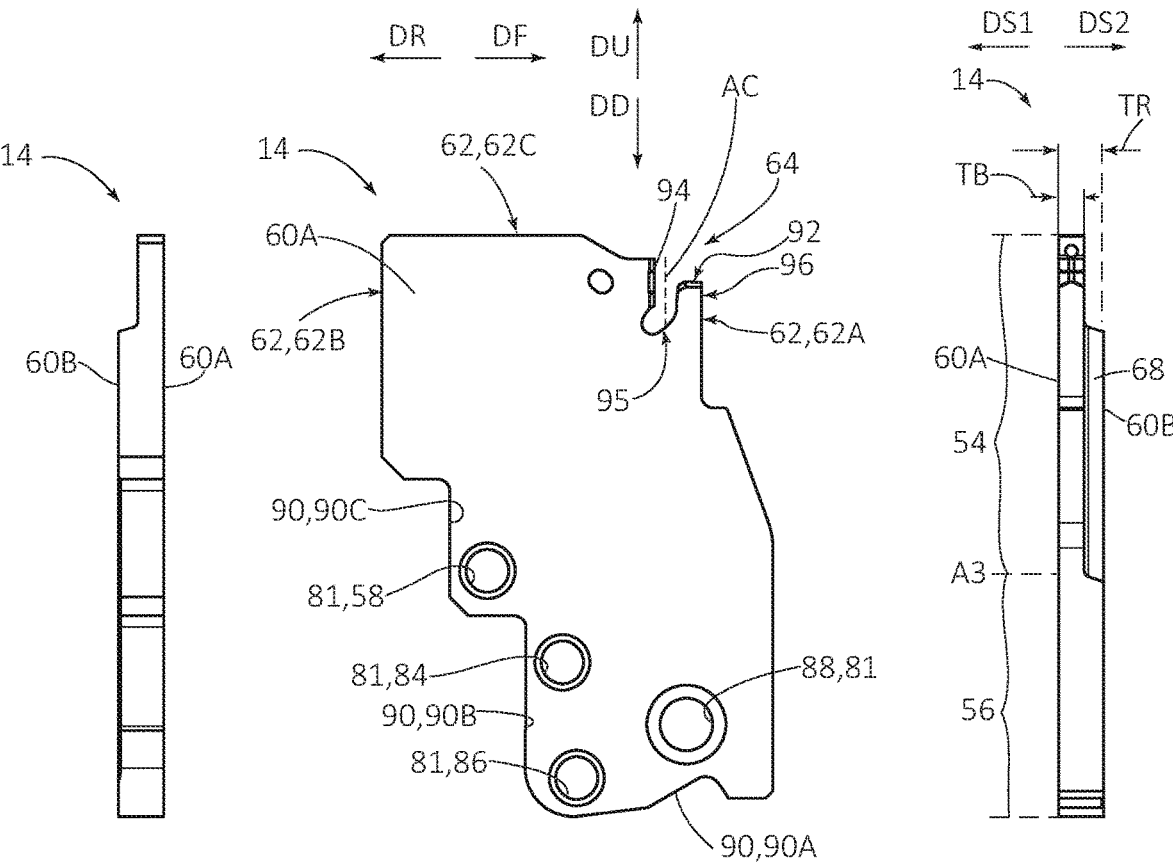
Fig. 3B
Fig. 3C
Fig. 3D
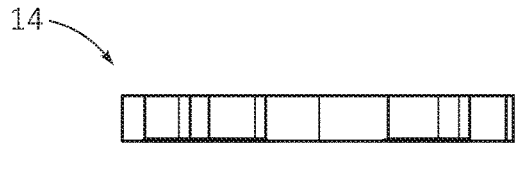
Fig. 3E

Y-AXIS PARTING ADAPTOR FOR A CUTTING TOOL

RELATED APPLICATIONS

This is a Bypass Continuation of PCT/IL2021/050772, filed Jun. 24, 2021, and published as WO 2022/013852A1 on Jan. 20, 2022. Priority is claimed to U.S. Provisional Patent Application No. 63/050,936 filed Jul. 13, 2020. The contents of the aforementioned applications are incorporated by reference in their entirety.

FIELD OF THE INVENTION

The subject matter of the present invention relates to a parting adaptor configured to carry out parting and grooving operations along a Y-axis feed direction, as well as a holder configured for holding same. The present invention is also directed to a tool assembly comprising both the parting adaptor and holder and a method of machining with the tool assembly.

BACKGROUND OF THE INVENTION

The present application relates to parting components and machining operations using those components in a so-called Y-axis feed direction, rather than an X-axis direction.

Such operations are disclosed in patent publications US 2020/0009757, directed to Y-axis blade portions, and US 2019/0358710 directed to a method of machining related to the same construction (hereinafter: "said patent publications").

Known product publications directed to blade portions corresponding to those shown in the above patent publications are disclosed in "Y-axis parting" by Sandvik Cormorant (said publication displaying an identifying footer: "C-1040:194 en-GB © AB Sandvik Coromant 2017"; hereinafter: "the Sandvik publication") and "Parting Off in the Y-Axis" by Horn (said publication displaying an identifying footer: "INFO11.19DE, September 2019, Printed in Germany"; hereinafter: "the Horn publication"). It will be understood that these product publications are exemplary and are not meant to be an exhaustive list of all catalogue publications related to these products.

Reverting to said patent publications, it is stated therein that there was a desire to reduce vibrations in traditional parting-off or deep grooving operations. Accordingly, an alternative blade portion is proposed in which, to summarize, the blade portion is elongated in basically the same direction as a main clearance surface of a cutting insert mounted to the blade portion. Stated succinctly in the Sandvik publication, the change is that the insert pocket is rotated 90 degrees.

The present applicant has also further discussed such tools in US 2019/0240741.

The present application is not directed to the variable overhang blades discussed in the earlier embodiments of said patent publications, but rather is directed to a so-called "parting adaptor" with a cutting portion and an adaptor shank portion which defines a single (non-variable) position of the adaptor in a holder similar to the type exemplified in the final embodiment of said patent publications (specifically FIGS. 16 to 18 in both publications) and as shown in the Horn publication.

Similar to the above-mentioned publications, a parting adaptor of the present invention is configured to be held by said holder which in turn comprises a holder head portion and a holder shank portion (also called a "coupling portion" in said patent publications) configured to connect to a machine interface such as a turret or tool post. The holder shank portion can be of any known type such as a rectangular or square-shaped cross-sectional shank (as shown in the drawings of the present application) or can be basically cylindrical or basically conical as per the types described in ISO standard 26623-1 or ISO 12164-3 (also identified in the above-mentioned publications).

It is an object of the present invention to provide a new and improved Y-axis parting adaptor, tool assembly including same and method of operation of such.

SUMMARY OF THE INVENTION

It has been observed that while the Y-axis parting tools described above can provide good vibration control, the set-up thereof is difficult.

Whereas a standard X-axis feed parting blade or parting adaptor can be secured to a holder (which is secured to a machine interface) and a parting operation can be initiated without any need to offset the position of the tool assembly (i.e. to adjust the settings for a non-zero position of the cutting edge; called hereinafter "offset"), with known Y-axis tool assemblies an offset is required along both the X-axis and Y-axis.

While machines capable of Y-axis feed machining are capable of providing both said offsets, it was conceived to reduce the setup complexity by providing a single-offset tool assembly to reduce the complexity for a user. While the setup is more complex than the X-axis feed tool assembly which does not require any offset, it can still provide the Y-axis stability (reduced vibration) advantage.

In accordance with a first aspect of the present invention, there is provided a tool assembly comprising: a parting adaptor; a cutting insert secured to an insert pocket of the parting adaptor and comprising a forwardmost cutting edge; and a holder comprising a holder shank portion in turn comprising a forwardmost holder shank surface and a holder shank cross-sectional shape; wherein: the holder shank cross-sectional shape is square or rectangular and the forwardmost cutting edge is directly above the forwardmost holder shank surface; or the holder shank cross-sectional shape is round and the holder shank axis extends to the forwardmost cutting edge.

Notably, for a square or rectangular holder shank (which is a standard shank type in the industry), a forwardmost cutting edge is to be aligned with a forwardmost holder shank surface which will then only require for the tool assembly to be offset in a single direction, if needed, in the X-axis direction (i.e. which is a direction parallel to a direction of elongation of the holder shank portion).

The alternative cross-sectional shape mentioned as "round" is a simplified way to define the basically cylindrical or basically conical shank cross sections as per the types described in ISO standard 26623-1 or ISO 12164-3. It will be understood that this too is a standard shank type in the industry. For such shank types, a forwardmost cutting edge is to be aligned with a central holder shank axis, which will then only require for the tool assembly to be offset in a single direction, if needed, i.e. in the X-axis direction.

The alternative option is the same concept, merely accounting for the two main shank types (i.e. with the alignment position being in the center of the round-type shank, or with the front of the square/rectangular type shank) used. It will be understood that the word "round" extends to different shank types (e.g. in the Horn publication the types shown, including their sizes, entitled "C6" on page 6 and "HSKT63" on page 7), but, stated differently, essentially means that the alignment position is along the center of the shanks.

Advantages of the various aspects are discussed below, after the recitation of the aspects.

The first aspect is written in a concise manner without defining features, such as reference directions, which are understood by a skilled person. For the sake of completeness, more specifically, in accordance with a second aspect of the present invention, there is provided a tool assembly comprising: a parting adaptor; a cutting insert; and a holder; the parting adaptor comprising: a cutting portion; and an adaptor shank portion connected to the cutting portion; the cutting portion comprising: opposing first and second sides; and a peripheral edge connecting the first and second sides; the peripheral edge comprising: opposing front and rear sub-edges; and an upper sub-edge connecting the front and rear sub-edges; the first and second sides defining a first sideways direction directed from the first side towards the second side and a second sideways direction opposite to the first sideways direction; a forward direction is defined perpendicular to the first and second sideways directions and directed from the rear sub-edge towards the front sub-edge, and a rearward direction is defined opposite to the forward direction; an upward direction is defined perpendicular to both the first and second sideways directions and to the forward and rearward directions, and is directed from the adaptor shank portion towards the cutting portion; a downward direction is defined opposite to the upward direction; the cutting portion further comprises: an insert pocket formed at an intersection of the front and upper sub-edges; the insert pocket comprises: a base jaw comprising a forwardmost base jaw surface; a second jaw at least partially located upward of the base seat jaw; and a slot end connecting the base jaw and the second jaw; the adaptor shank portion comprising: an adaptor clamping arrangement; the cutting insert is secured to the insert pocket and comprises: an insert base surface abutting the base jaw; an upwardly facing rake surface located above the insert base surface; an insert second surface abutting the second jaw; a forwardmost clearance surface extending downwardly from the rake surface; and a forwardmost cutting edge formed at an intersection of the rake surface and the forwardmost clearance surface; the holder comprising: a holder head portion; and a holder shank portion connected to the holder head portion; the holder head portion comprising: an adaptor pocket to which the adaptor shank portion is secured; the holder shank portion comprising: a holder shank axis extending through the center of the holder shank and extending parallel with the upward and downward directions; a holder shank cross-sectional shape extending perpendicular to the holder shank axis and being either (a) square or rectangular or (b) round; a forwardmost holder shank surface; and an imaginary line extends in the upward direction from the forwardmost holder shank surface; wherein: the holder shank cross-sectional shape is square or rectangular and the forwardmost cutting edge is directly above the forwardmost holder shank surface; or the holder shank cross-sectional shape is round and the holder shank axis extends to the forwardmost cutting edge.

The second aspect has the same advantage as the first aspect.

While the standard definition relating to offset is as described above in connection to a cutting insert in the first and second aspects, an alternative definition of the present invention can be made without a cutting insert.

Accordingly, a third aspect of the present invention provides a tool assembly comprising: a parting adaptor; and a holder comprising a holder shank portion in turn comprising a forwardmost holder shank surface, an imaginary line extending in an upward direction from the forwardmost holder shank surface, and a holder shank cross-sectional shape; the parting adaptor comprising an insert pocket which in turn comprises: a base jaw comprising a forwardmost base jaw surface; and a second jaw connected to the base jaw via a slot end; wherein: the holder shank cross-sectional shape is square or rectangular and the forwardmost base jaw surface is within a tolerance distance DT of 2 mm from the imaginary line; or the holder shank cross-sectional shape is round and the forwardmost base jaw surface is within a tolerance distance DT of 2 mm from the holder shank axis.

The third aspect is written in a concise manner without defining features, such as reference directions, which are understood by a skilled person. For the sake of completeness, more specifically, in accordance with a fourth aspect of the present invention, there is provided a tool assembly comprising: a parting adaptor; and a holder; the parting adaptor comprising: a cutting portion; and an adaptor shank portion connected to the cutting portion; the cutting portion comprising: opposing first and second sides; and a peripheral edge connecting the first and second sides; the peripheral edge comprising: opposing front and rear sub-edges; and an upper sub-edge connecting the front and rear sub-edges; the first and second sides defining a first sideways direction directed from the first side towards the second side and a second sideways direction opposite to the first sideways direction; a forward direction is defined perpendicular to the first and second sideways directions and directed from the rear sub-edge towards the front sub-edge, and a rearward direction opposite to the forward direction; an upward direction is defined perpendicular to both the first and second sideways directions and to the forward and rearward directions, and is directed from the adaptor shank portion towards the cutting portion; a downward direction is defined opposite to the upward direction; the cutting portion further comprises: an insert pocket formed at an intersection of the front and upper sub-edges; the insert pocket comprises: a base jaw comprising a forwardmost base jaw surface; a second jaw at least partially located upward of the base seat jaw; and a slot end connecting the base jaw and the second jaw; the adaptor shank portion comprising: an adaptor clamping arrangement; the holder comprising: a holder head portion; and a holder shank portion connected to the holder head portion; the holder head portion comprising: an adaptor pocket to which the adaptor shank portion is secured; the holder shank portion comprising: a holder shank axis extending through the center of the holder shank and extending parallel with the upward and downward directions; a holder shank cross-sectional shape extending perpendicular to the holder shank axis and being either (a) square or rectangular or (b) round; a forwardmost holder shank surface; and an imaginary line extends in the upward direction from the forwardmost holder shank surface; wherein: the holder shank cross-sectional shape is square or rectangular and the forwardmost base jaw surface is within a tolerance distance DT of 2 mm from the imaginary line; or the holder shank cross-sectional shape is round and the forwardmost base jaw surface is within a tolerance distance DT of 2 mm from the holder shank axis.

Preferably, the tolerance distance DT is smaller than 1 mm, more preferably smaller than 0.5 mm.

A preferred parting adaptor which could be used in the tool assembly aspects above will now be described. Nonetheless, it will be understood that this is only a preference since the tool assembly aspects and method aspect recited below are independently advantageous over the prior art, even without the features recited in the parting adaptor aspects below.

In accordance with a fifth aspect of the present invention, there is provided a parting adaptor comprising: a blade region defined by having a blade portion thickness equal to a minimum thickness of a cutting portion of the parting adaptor, the blade region having: a maximum height HM measurable parallel to the upward and downward directions and from a lowest blade region point to a highest blade region point; a maximum width WM measurable parallel to the forward and rearward directions and from a forwardmost blade region point to a rearwardmost blade region point; wherein: the maximum width WM and the maximum height HM fulfill the condition: WM≥HM.

Notably, in contradistinction to the above-mentioned publications, the above-defined parting adaptor has a maximum width greater than the maximum height thereof. This may allow a smaller overhang and depth of cut but provides better stability due to the force applied on the cutting insert and subsequently on the insert pocket during machining. Nonetheless, there is a significant limitation to the width range that can be provided as described below.

The fifth aspect is written in a concise manner without defining features, such as reference directions, which are understood by a skilled person.

For the sake of completeness, more specifically, in accordance with a sixth aspect of the present invention, there is provided a parting adaptor comprising: a cutting portion; and an adaptor shank portion connected to the cutting portion; the cutting portion comprising: opposing first and second sides; and a peripheral edge connecting the first and second sides; the peripheral edge comprising: opposing front and rear sub-edges; and an upper sub-edge connecting the front and rear sub-edges; the first and second sides defining a first sideways direction directed from the first side towards the second side and a second sideways direction opposite to the first sideways direction; a forward direction is defined perpendicular to the first and second sideways directions and directed from the rear sub-edge towards the front sub-edge, and a rearward direction opposite to the forward direction; an upward direction is defined perpendicular to both the first and second sideways directions and to the forward and rearward directions, and is directed from the adaptor shank portion towards the cutting portion; a downward direction is defined opposite to the upward direction; the cutting portion further comprises: an insert pocket formed at an intersection of the front and upper sub-edges; a blade portion thickness measured parallel to the first and second sideways at the insert pocket; and a blade region defined by having a thickness corresponding to the blade portion thickness; the blade region having: a maximum height HM measurable parallel to the upward and downward directions and from a lowest blade region point to a highest blade region point; a maximum width WM measurable parallel to the forward and rearward directions and from a forwardmost blade region point to a rearwardmost blade region point; wherein: the maximum width WM and the maximum height HM fulfill the condition: WM≥HM.

In accordance with a seventh aspect of the present invention, there is provided a tool assembly having a longitudinal axis which establishes opposite upward and downward directions; a lateral axis which intersects and is perpendicular to the longitudinal axis, the lateral axis establishing opposite forward and rearward directions, respectively; and a thickness axis which intersects and is perpendicular to both the longitudinal axis and the lateral axis, the thickness axis establishing opposite first sideways and second sideways directions, respectively, the tool assembly comprising: a holder comprising a holder shank having a holder shank axis extending along a center of the holder shank, the holder shank axis being coincident with the longitudinal axis, the holder shank comprising a forwardmost holder shank surface which is forwardmost in the forward direction; and a holder head connected to the holder shank and extending forward therefrom along the longitudinal axis, the holder head comprising an adaptor pocket facing in the first sideways direction; and a parting adaptor secured to the adaptor packet of the holder head, the parting adaptor comprising: an adaptor shank having an adaptor clamping arrangement through which the parting adaptor is secured to the adaptor pocket of the holder head; and an adaptor cutting portion connected to the adaptor shank, and comprising: first and second sides facing in opposite first sideways and second sideways directions, respectively; a peripheral edge connecting the first and second sides, the peripheral edge comprising front and rear sub-edges spaced apart from one another along the lateral axis and an upper sub-edge connecting the front and rear sub-edges; and an insert pocket formed at an intersection of the front and upper sub-edges, the insert pocket comprising: a base jaw comprising a forwardmost base jaw surface; a second jaw at least partially located upward of the base seat jaw; and a slot end connecting the base jaw and the second jaw; wherein: in a plan view of the tool assembly: an imaginary line extending parallel to the longitudinal axis, from the forwardmost holder shank surface, through at least a portion of the holder head and past the parting adaptor in the upward direction, passes within a tolerance distance DT of 2 mm of the forwardmost base jaw surface.

The tool assembly can further comprise a cutting insert secured in the parting adaptor's insert pocket and comprising: an insert base surface abutting the base jaw; an insert second surface abutting the second jaw; an upwardly facing rake surface forward of the insert base surface; a forwardmost clearance surface extending in the downward direction from the rake surface; and a forwardmost cutting edge formed at an intersection of the rake surface and the forwardmost clearance surface.

In accordance with an eighth aspect of the present invention, there is provided a method of parting in a Y-axis feed direction comprising the steps of:

(a) securing a parting adaptor to a holder comprising an elongated shank;
  (b) before or after step (a) securing the holder to a machining interface;
  (c) setting an offset only in an X-axis direction, defined as a direction parallel to the holder's elongated shank; and
  (d) subsequent to step (c), moving the parting adaptor, relative to a rotating workpiece, in the Y-axis direction, defined as a direction perpendicular to the X-axis direction, to part-off the workpiece.

The above method is preferably performed using a parting adaptor or tool assembly defined in the previous aspects.

It will be understood that said method on the one-hand is more complicated than a normal method of parting in the X-axis feed direction, but is simpler than the current known method of parting in the Y-axis feed direction.

Advantages over the prior art will now be discussed.

Without being bound to theory, it is assumed that the known prior art Y-axis feed blades and parting adaptors were not conceived with the advantageous alignment above for at least the following reasons. The first reason is that the force arrangement in the prior art appears more logical with the cutting edge being forward of the forwardmost holder shank surface or central holder shank axis (depending on which shank-type is used). This is because the machining forces are not in the exact Y-axis direction (downward) but rather in the downward and rearward direction (oblique), as shown in FIG. 6 of the above-mentioned US 2019/0240741.

Since the entire purpose of the known prior art is to improve stability, it is logical to have the downward and rearward cutting force directed as much as possible to the area where the machining interface is secured to a holder. Moving the cutting edge rearwardly is expected to increase the vibrations of the tool assembly.

Accordingly, the present invention takes into account a sacrifice of some stability in return for a different benefit of ease of setup.

A second reason is that it probably would not seem to be beneficial for a single offset to be simpler to an operator than two offsets (since an offset needs to be inputted in any case, however the present inventor believes that such benefit nonetheless may be preferred over a slight amount of additional stability.

Additionally, as further defined in the parting adaptor aspects (such aspects of course being able to be used in the tool assembly aspects) the height of the parting adaptor is preferably less than the height of known elongated (tall and thin) parting blades and adaptors. Thus, while this reduces the overall overhang (and hence depth of cut capability) the main cutting forces are more directed towards the machine interface than would be the case if the cutting edge would be further spaced in the upward direction from the machine interface.

Yet a second advantage of reducing said height relative to said width is that this also provides further stability to the unsupported cutting portion of the parting adaptor (i.e. the portion not secured to the holder and hence susceptible to bending).

Without being bound to theory, it is believed that it was preferred for the prior art blades and parting adaptors to be thinner and longer to provide a more advantageous depth of cut, the stability of said tools being already provided by the advantage of machining in the Y-axis feed direction which already directs the machining force towards the machine interface.

Nonetheless, there is a limit in how much the parting adaptor of the present application can be widened, since such tools are preferably designed (in an end view thereof) to remain within a circumscribing circle of a desired dimension (see, for example, the Horn publication, page 6, which shows a circumscribing circle of 104 mm diameter in such view). One known reason for this size limitation is so that the automated tool changing systems can change the tool assembly being used with another one in the system. If said size is exceeded, the two tool assemblies can crash into one another.

Accordingly, the prior art tools may not have been conceived to be possibly wider than they are, or with a cutting edge displaced further backwards than they are (since to compensate for stability the blade portion still needs a certain amount of material behind it for stability).

Bearing the above limitations in mind, preferred maximum height-to-width ratios are provided for the present invention, which was intended to benefit from greater stability yet in preferred embodiments still be compatible with known automated tool changing systems.

Accordingly, some preferred features according to any of the embodiments are as follows.

Preferably, the maximum width WM and the maximum height HM fulfill the condition: WM≥1.05 HM, preferably WM≥1.10 HM. Nonetheless, for the reasons provided above, it is preferable that the maximum width WM and the maximum height HM fulfill the condition: WM≤1.30 HM, preferably WM≥1.20 HM.

Preferably a parting adaptor further comprises a reinforcement region having a reinforcement thickness measured parallel to the blade portion thickness and being larger than the blade portion thickness. This can improve stability of the cutting portion of the parting adaptor which is not secured to the holder.

While such reinforcement-like portions are known, the known prior art is not known to provide extremely high reinforcement portions. In the present invention, it is preferred that the reinforcement region extends in the upward direction a reinforcement portion height HR from the lowest blade region point; and the reinforcement portion height HR and the maximum height HM fulfills the condition: HR>0.5 HM, preferably HR>0.65 HM and most preferably HR>0.75 HM.

Nonetheless, despite the fact that such reinforcement portion adds to stability, it is still preferred in some embodiments that it does not extend the entire height of the cutting portion. Accordingly, it is preferred that the parting adaptor fulfill the condition: HR<HM, preferably HR<0.95 HM.

Preferably an insert pocket's second jaw is located in its entirety rearward of the base jaw. Alternatively or additionally, the insert pocket's second jaw and base jaw extend adjacent to each other in a direction parallel to the upward and downward directions.

It will be understood that the prior art Y-axis feed blades and parting adaptors have a second jaw which extends over the base jaw thereof. Accordingly the slot end (and more importantly elasticity groove) extends rearwardly of the base jaw and second jaw. This means that the blade or parting adaptor needs to extend a comparatively larger distance rearward of the insert pocket (i.e. rearward of the slot end) to provide the same structural stability as a parting adaptor provided with the insert pocket defined in the previous paragraph. Accordingly, this is yet another reason that the prior art blades and parting adaptors were designed with cutting edges further forward of the position defined in the present invention (also taking into account the size restrictions noted in reference to the circumscribing circle mentioned above).

For similar reasons, it is preferred that a parting adaptor according to the present invention comprise only a single insert pocket.

While a non-elongated cutting portion is believed beneficial for some embodiments, as mentioned above. It is still preferred that the overall shape of the insert adaptor is elongated when measured parallel to the upward and downward direction.

To elaborate, by providing the present two-component solution (i.e. a parting adaptor secured to a holder, the holder in turn being configured to be secured to a machining interface) instead of the three-component solution shown in US 2019/0240741 (i.e. a parting blade secured to a holder, the holder in turn being secured to an additional holder, the additional holder being configured to be secured to a machining interface) this further assists in avoiding exceeding the circumscribing circular size restriction shown in FIG. 1A and also reduces the overhang length from the machining interface.

It is preferred that the insert pockets of the present invention be of the resilient type (i.e. without screws) exemplified.

While a parting adaptor's adaptor clamping arrangement could have different constructions such as tapered edges similar to a parting blade, it is preferred that the adaptor clamping arrangement comprises at least one screw hole for at least one screw to secure it to a holder. This further provides the desired ease of setup discussed above (rather than the sliding variable depth blades of the prior art).

Various features above are described with words such as "forwardmost". It will be understood that "forwardmost" in the present application means relative to the remainder of the component (e.g. the parting adaptor) said feature is more in the most forward direction. It will also be understood that all directions given are for reference of features relative to one another and not in an absolute sense to the ground. Similarly, it will be understood that while directions may have been optionally chosen to be defined relative to a particular component such as a parting adaptor, they could similarly be defined relative to a holder or tool assembly.

Finally, as is well known in the art, a rake surface is the surface above which machined chips are intended to flow and a clearance surface is typically designed to be receded from a cutting edge.

BRIEF DESCRIPTION OF THE DRAWINGS

For a better understanding of the subject matter of the present application, and to show how the same may be carried out in practice, reference will now be made to the accompanying drawings, in which:

FIG. 3A is a top view of a parting blade shown in FIG. 1A;

FIG. 3B is a rear view of the parting blade shown in FIG. 3A;

FIG. 3C is a first side, or "plan", view of the parting blade shown in FIG. 3A, corresponding to the first side view of FIG. 1B;

FIG. 3D is a front view of the parting blade shown in FIG. 3A; and

FIG. 3E is a bottom view of the parting blade shown in FIG. 3A.

DETAILED DESCRIPTION

Figures 1A, 1B, 1C, 1D, 1E:
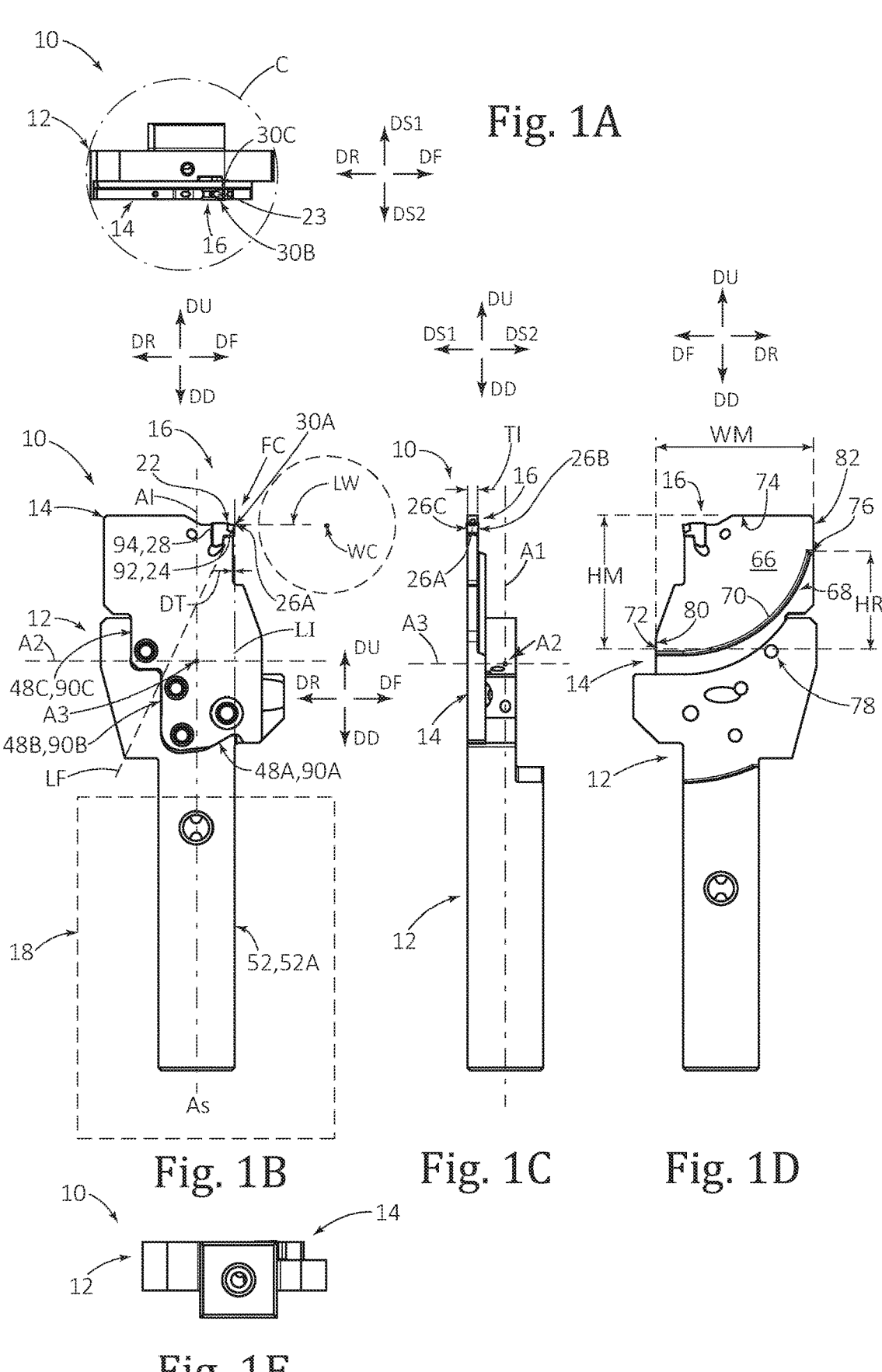
FIG. 1A is a top view of a tool assembly according to the present invention.
FIG. 1B is a first side, or "plan" view of the tool assembly in FIG. 1A, and further shows the tool assembly connected to a schematic machine interface as well as a schematic workpiece.
FIG. 1C is a front view of a tool assembly in FIG. 1A.
FIG. 1D is a second side view of the tool assembly in FIG. 1A.
FIG. 1E is a bottom view of the tool assembly in FIG. 1A.
Figures 2A, 2B, 2C, 2D, 2E:
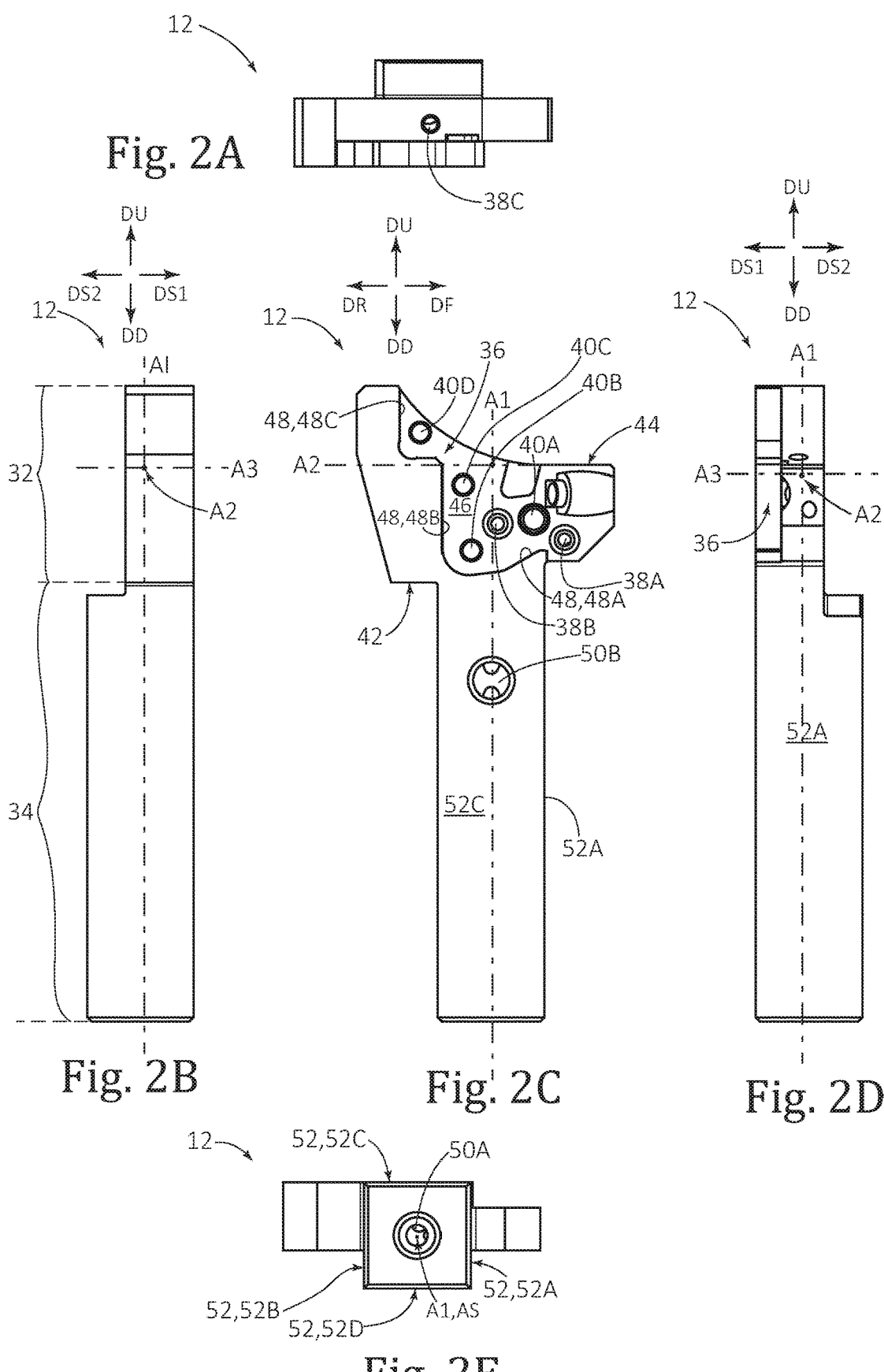
FIG. 2A is a top view of a holder shown in FIG. 1A.
FIG. 2B is a rear view of the holder in FIG. 2A.
FIG. 2C is a first side, or "plan", view of the holder in FIG. 2A, corresponding to the first side view of FIG. 1B.
FIG. 2D is a front view of the holder in FIG. 2A.
FIG. 2E is a bottom view of the holder in FIG. 2A.

Referring to FIGS. 1A to 1E, a tool assembly 10 is shown, the tool assembly 10 comprising a holder 12, a parting adaptor 14 secured to the holder 12, and a cutting insert 16 secured to the parting adaptor 14. As seen in FIGS. 1B and 1C, the tool assembly 10 has a longitudinal axis A1 which establishes opposite upward and downward directions DU, DD; a lateral axis A2 which intersects and is perpendicular to the longitudinal axis A1, the lateral axis A2 establishing opposite forward and rearward directions DF, DR, respectively; and a thickness axis A3 which intersects and is perpendicular to both the longitudinal axis A1 and the lateral axis A2, the thickness axis A3 establishing opposite first sideways and second sideways directions DS1, DS2, respectively. As seen in FIGS. 2B-2D, these same axes A1, A2, A3 and directions also pertain to the holder 12.

Referring particularly to the plan view of the tool assembly 10 seen in FIG. 1B, the holder 12 is shown secured to a schematic machine interface 18 shown in phantom and is positioned proximate to a schematic cylindrical rotating workpiece 20, also shown in phantom.

For explanation, the figures show a forward direction DF, a rearward direction DR, an upward direction DU, a downward direction DD, a first sideways direction DS1 and a second sideways direction DS2.

As will be understood from FIG. 1B, which shows the tool assembly 10 relative to the machine interface 18, the upward direction DU also constitutes an X-axis direction, which is parallel to the longitudinal axis A1.

As also will be understood from FIG. 1B, which shows the tool assembly 10 relative to the workpiece 20, the forward direction DF also constitutes a Y-axis feed direction, which is parallel to the lateral axis A2.

Reverting to the remainder of FIGS. 1A to 1E, the cutting insert 16 comprises: a rake surface 22 and an opposing insert base surface 24, a forwardmost clearance surface 26A extending downwardly (as well as slightly inwardly) from the rake surface 22 and an opposing insert rear surface 28, opposing side clearance surfaces 26B, 26C extending downwardly (as well as slightly inwardly) from the rake surface 22, a forwardmost cutting edge 30A formed at an intersection of the rake surface 22 and the forwardmost clearance surface 26A and having a maximum insert thickness TI; and side cutting edges 30B, 30C connected to the forwardmost cutting edge 30A and formed at an intersection of the rake surface 22 and the side clearance surfaces 26B, 26C. US20070086864A1 discloses an exemplary cutting insert having the above-described basic shape.

Preferably, the rake surface 22 comprises a chip forming arrangement 23.

Referring also to FIGS. 2A to 2E, the holder 12 comprises a holder head portion 32 and a holder shank portion 34.

The holder head portion 32 comprises an adaptor pocket 36, a plurality of coolant outlets 38A, 38B, 38C, and a plurality of threaded screw-holes 40A, 40B, 40C, 40D.

Of note is a lower head abutment surface 42, which preferably abuts the machine interface 18 (not shown).

The holder head portion 32 comprises a holder concave front surface 44 which is concavely curved in the upward direction DU. The holder concave front surface 44 is useful for when the holder 12 is used with a standard parting adaptor (not shown) in a machining operation along an X-axis feed direction, but is optional for the present invention. Nonetheless, such feature is preferred as it allows a single adaptor to be used for both the X-axis feed direction and the Y-axis feed direction.

FIG. 2C is a plan view of the holder 12 and shows details of the adaptor pocket 36. The adaptor pocket 36 opens out towards the first sideways direction DS1 (as well as the forward direction DF and the upward direction DU) and comprises an adaptor pocket base 46 facing said sideways direction DS1, and a pocket projecting wall 48 extending therefrom in the first sideways direction DS1.

The pocket projecting wall 48 can comprise an adaptor pocket lower abutment surface 48A, a pocket first rear abutment surface 48B, and a pocket second rear abutment surface 48C.

The holder shank portion 34 comprises a plurality of coolant inlets 50A, 50B and, as best seen in FIG. 2E, a square cross sectional shape 52. The square cross-sectional shape 52 is formed by a forwardmost shank surface 52A which faces in the forward direction DF, a rearwardmost shank surface 52B facing in the rearward direction DR and first and second side shank surfaces 52C, 52D which face in opposite first and second sideways directions DS1, DS2, respectively. The forwardmost shank surface 52A extends along longitudinal axis A1 and is parallel thereto.

The holder shank portion 34 further has a holder shank axis AS which extends in the upward and downward directions DU, DD parallel to the longitudinal axis A1. In the figures, the holder shank axis AS is shown to be coincident with the longitudinal axis A1. The holder shank axis AS represents the center of the holder shank portion 34, both in the case of a shank having a square or rectangular cross-section, and also in the case of a shank having round (circular) cross-section.

As shown in the plan view of the tool assembly (FIG. 1B), an imaginary line LI extends in the upward direction DU, parallel to the longitudinal axis A1, from the forwardmost holder shank surface 52A to the forwardmost cutting edge 30A. Since the position of the holder shank portion 34 is set from its connection with the machine interface 18, the position of the forwardmost cutting edge 30A is similarly known and does not require any offset input. The only calibration needed is in the upward and downward directions DU, DD, to ensure the forwardmost cutting edge 30A is aligned with a workpiece center point WC as schematically shown by the imaginary workpiece line WL extending parallel to the forward and rearward directions DF, DR from the center point WC to the forwardmost cutting edge 30A.

Even without the imaginary line LI, which is a useful explanatory aid as shown in the side view of FIG. 1B, it is understood that the forwardmost cutting edge 30A is directly above (i.e., in an upward direction DU parallel to the longitudinal axis A1 from the holder shank portion 34) the forwardmost holder shank surface 52A.

Referring now also to FIGS. 3A to 3E, the parting adaptor 14 comprises a cutting portion 54 and an adaptor shank portion 56. For reasons explained below, the cutting portion 54 does not include the first adaptor screw hole 58 seen in FIG. 3B, even though one might think from the designation '54' in FIG. 3D it is included.

The cutting portion 54 comprises opposing first and second sides 60A, 60B, and a peripheral edge 62. In the assembled tool, the first side 60A faces the first sideways direction DS1, and the second side 60A faces the second sideways direction DS2.

The peripheral edge 62 comprises opposing front and rear sub-edges 62A, 62B and an upper sub-edge 62C.

The cutting portion 54 further comprises an insert pocket 64.

The cutting portion 54 has a blade portion thickness TB measured parallel to the first and second sideways directions DS1, DS2 (i.e., along the thickness axis A3) at the insert pocket.

The blade portion thickness TB is thinner than a maximum insert thickness TI (shown in FIG. 1C).

A blade region 66 is defined as being any region of the parting adaptor's cutting portion 54 which has the blade portion thickness TB. It will be understood that any portion of the cutting portion 54 which is not thinner than the maximum insert thickness TI will limit the depth of cut the parting adaptor 14 is adapted for since such portion cannot enter a workpiece 20.

In the given example the parting adaptor 14 preferably further comprises a reinforcement region 68 defined by a reinforcement thickness TR.

Referring also particularly to FIG. 1D, the reinforcement region 68 comprises a concave edge 70 which merges to the blade region 66. The concave edge 70 defines a maximum cut depth of the parting adaptor 14.

The blade region 66 has a maximum height HM measurable from a lowest blade region point 72 to a highest blade region point 74.

The reinforcement region 68 extends in the upward direction DU to a reinforcement portion height HR from a lowest blade region point 72.

In the given example the reinforcement region 68 does not extend to the highest blade region point 74 and therefore the reinforcement portion height HR is measured to a highest reinforcement portion point 76.

For the sake of completeness, the blade region 66 further comprises a maximum width WM measurable from a forwardmost blade region 80 point to a rearwardmost blade region point 82.

Since the parting adaptor 14 in any case cannot enter a workpiece past the concave edge 70 it will be understood that the first adaptor screw hole 58 (which is hidden in FIG. 1D but the position of which is shown schematically by arrow 78) is not part of the cutting portion 54 but rather part of the adaptor shank portion 56.

The adaptor shank portion 56 further comprises an adaptor clamping arrangement 81 which in turn comprises said first adaptor screw hole 58 and second, third and fourth adaptor screw holes 84, 86, 88 via which screws (not shown) extend through to secure the parting adaptor 14 to the holder's threaded screw-holes 40A, 40B, 40C, 40D.

Additionally, the adaptor shank portion 56 further comprises an adaptor shank edge 90 comprising an adaptor edge lower abutment surface 90A, an adaptor edge first rear abutment surface 90B, and an adaptor edge second rear abutment surface 90C.

During assembly, the adaptor pocket lower abutment surface 48A abuts the adaptor edge lower abutment surface 90A, the adaptor pocket first rear abutment surface 48B abuts the adaptor edge first rear abutment surface 90B, and the adaptor pocket second rear abutment surface 48C abuts the adaptor edge second rear abutment surface 90C. Notably, this is the ideal situation, however, in practice, it may be that only one of the adaptor pocket first rear abutment surface 48B and adaptor pocket second rear abutment surface 48C contacts the parting adaptor 14.

The insert pocket 64 comprises a base jaw 92, a second jaw 94 and a slot end 95. The second jaw 94, in this non-limiting example, is located rearward of the base jaw 92 along the lateral axis A2, and thus may be considered a rear jaw 94.

An insert pocket central axis AC extends midway between the base jaw 92 and the second jaw 94. In the assembled tool the insert pocket central axis AC extends in the upward and downward directions DU, DD, generally parallel to the longitudinal axis A1. Accordingly, since the insert pocket 64 is different from a more common alternative insert pocket type (not shown) which extends basically in the forward and rearward directions DF, DR, the largest dimension of the present insert pocket 64 is small relative to said alternative insert pockets which have a second jaw that extends over the base jaw (not shown).

Extending in the downward direction DD from the base jaw 92 is a forwardmost base jaw surface 96.

Referring particularly to the plan views seen FIGS. 1B and 3C, the cutting insert 16 is secured to the insert pocket 64. More specifically, the only contact points of the cutting insert 16 and the insert pocket 64 are: the insert base surface 24 abuts the base jaw 92, and the insert second surface 28 abuts the second jaw 94.

As seen in the plan view of the tool assembly 10 in FIG. 1B, the imaginary line L1 extends parallel to the longitudinal axis A1, from the forwardmost holder shank surface 52A, along at least a portion of the holder head 32 and past the parting adaptor 14 in the upward direction DU, as it passes within a tolerance distance DT of 2 mm of the forwardmost base jaw surface 96. Simply put, the forwardmost base jaw surface 96 is within a tolerance distance DT (FIG. 1B) from the imaginary line LI.

Regarding the advantages and disadvantages of the shape of the parting adaptor 14, to explain with the schematic elements (cutting force direction FC and machining interface 20) shown in FIG. 1B: as shown the cutting force FC is more in the downward direction DD than the rearward direction DR.

Nonetheless it would have been preferable, for reducing vibrations, if the direction of said cutting force FC, shown with the imaginary force extension line LF, would have been directed more towards where the holder 12 is held by the machine interface 18, such that the more rigid machining interface 18 would resist vibration of the holder 12 more effectively.

It will be understood that if the parting adaptor 14 would have been even longer (and therefore the cutting insert would be further distanced from the machine interface), in the present invention where the insert pocket 64 and/or cutting insert 16 is more rearward than known in the prior art, the imaginary force extension line LF would be spaced even further from where the holder is held by the machine interface 18. Thus the shape of the present parting adaptor 14 somewhat offsets the disadvantage of the relatively more rearward insert pocket 64 and/or cutting insert 16.

Even though the exemplified wide parting adaptor 14 can provide advantageous structural strength, it is still preferred that it not exceed a circumscribing circle C (FIG. 1A) of the holder 12 in the end view of the tool assembly shown as FIG. 1A. This can be advantageous for keeping a compact structure for tool-change purposes. For similar reason (i.e. for tool-change purposes) it is preferred that the entire parting adaptor 14 be elongated.

What is claimed is:

1. A tool assembly comprising:
   a parting adaptor;
   a cutting insert; and
   a holder;
   the parting adaptor comprising:
     a cutting portion; and
     an adaptor shank portion connected to the cutting portion;
   the cutting portion comprising:
   opposing first and second sides; and
   a peripheral edge connecting the first and second sides;
   the peripheral edge comprising:
     opposing front and rear sub-edges; and
     an upper sub-edge connecting the front and rear sub-edges;

the first and second sides defining a first sideways direction directed from the first side towards the second side and a second sideways direction opposite to the first sideways direction;
a forward direction is defined perpendicular to the first and second sideways directions and directed from the rear sub-edge towards the front sub-edge, and a rearward direction is defined opposite to the forward direction;
an upward direction is defined perpendicular to both the first and second sideways directions and to the forward and rearward directions, and is directed from the adaptor shank portion towards the cutting portion;
a downward direction is defined opposite to the upward direction; the cutting portion further comprises: an insert pocket formed at an intersection of the front and upper sub-edges;
the insert pocket comprises:
  a base jaw comprising a forwardmost base jaw surface;
  a second jaw at least partially located upward of the base seat jaw; and
  a slot end connecting the base jaw and the second jaw;
  the adaptor shank portion comprising:
  an adaptor clamping arrangement;
  the cutting insert is secured to the insert pocket and comprises:
  an insert base surface abutting the base jaw;
  an upwardly facing rake surface located above the insert base surface;
  an insert second surface abutting the second jaw;
  a forwardmost clearance surface extending downwardly from the rake surface; and
  a forwardmost cutting edge formed at an intersection of the rake surface and the forwardmost clearance surface;
  the holder comprising:
  a holder head portion; and
  a holder shank portion connected to the holder head portion;
  the holder head portion comprising:
  an adaptor pocket to which the adaptor shank portion is secured;
  the holder shank portion comprising:
  a holder shank axis extending through the center of the holder shank and extending parallel with the upward and downward directions;
  a holder shank cross-sectional shape extending perpendicular to the holder shank axis and being either (a) square or rectangular or (b) round;
  a forwardmost holder shank surface; and
  an imaginary line extends in the upward direction from the forwardmost holder shank surface; wherein:
    the holder shank cross-sectional shape is square or rectangular and the forwardmost cutting edge is directly above the forwardmost holder shank surface; or
    the holder shank cross-sectional shape is round and the holder shank axis extends to the forwardmost cutting edge.

2. The tool assembly according to claim 1, wherein:
the holder shank cross-sectional shape is square or rectangular and the forwardmost base jaw surface is within a tolerance distance DT of 2 mm from the imaginary line; or
the holder shank cross-sectional shape is round and the forwardmost base jaw surface is within a tolerance distance DT of 2 mm from the holder shank axis.

3. The tool assembly according to claim 2, wherein the tolerance distance DT is smaller than 1 mm.

4. The tool assembly according to claim 3, wherein the tolerance distance DT is smaller than 0.5 mm.

5. The tool assembly according to claim 1, wherein the cutting portion further comprises:

a blade portion thickness measured parallel to the first and second sideways at the insert pocket; and a blade region defined by having a thickness corresponding to the blade portion thickness, the blade region having:

a maximum height HM measurable parallel to the upward and downward directions and from a lowest blade region point to a highest blade region point;

a maximum width WM measurable parallel to the forward and rearward directions and from a forwardmost blade region point to a rearwardmost blade region point;

wherein: the maximum width WM and the maximum height HM fulfill the condition: WM≥HM.

6. The tool assembly according to claim 5, fulfilling the condition: WM≥1.05 HM.

7. The tool assembly according to claim 6, fulfilling the condition: WM≥1.10 HM.

8. The tool assembly according to claim 5, fulfilling the condition: WM≤1.30 HM.

9. The tool assembly according to claim 8, fulfilling the condition: WM≥1.20 HM.

10. The tool assembly according to claim 1, further comprising:

a reinforcement region having a reinforcement thickness measured parallel to the blade portion thickness and being larger than the blade portion thickness;

wherein:

the reinforcement region extends in the upward direction a reinforcement portion height HR from the lowest blade region point; and the reinforcement portion height HR and the maximum height HM fulfills the condition: HR>0.5 HM.

11. The tool assembly according to claim 10, fulfilling the condition: HR>0.65 HM.

12. The tool assembly according to claim 11, fulfilling the condition: HR>0.75 HM.

13. The tool assembly according to claim 10, fulfilling the condition: HR<HM.

14. The tool assembly according to claim 13, fulfilling the condition: HR<0.95 HM.

15. The tool assembly according to claim 1, wherein the insert pocket's second jaw is located in its entirety rearward of the base jaw.

16. The tool assembly according to claim 15, wherein the insert pocket's second jaw and base jaw extend adjacent to each other in a direction parallel to the upward and downward directions.

17. The tool assembly according to claim 1, only comprising a single insert pocket.

18. The tool assembly according to claim 1, wherein the overall shape of the insert adaptor is elongated when measured parallel to the upward and downward direction.

19. A tool assembly comprising:

a parting adaptor comprising:

a cutting portion comprising:

opposing first and second sides and a peripheral edge connecting the first and second sides, the peripheral edge comprising opposing front and rear sub-edges and an upper sub-edge connecting the front and rear sub-edges; wherein:

the first and second sides define a first sideways direction directed from the first side towards the second side and a second sideways direction opposite to the first sideways direction;

a forward direction is defined perpendicular to the first and second sideways directions and directed from the rear sub-edge towards the front sub-edge, and a rearward direction is defined opposite to the forward direction;

an upward direction is defined perpendicular to both the first and second sideways directions and to the forward and rearward directions, and is directed from the adaptor shank portion towards the cutting portion; and a downward direction is defined opposite to the upward direction; and a single insert pocket formed at an intersection of the front and upper sub-edges, the single insert pocket comprising:

a base jaw comprising a forwardmost base jaw surface;

a second jaw at least partially located upward of the base seat jaw; and a slot end connecting the base jaw and the second jaw; and an adaptor shank portion connected to the cutting portion and comprising an adaptor clamping arrangement;

a cutting insert secured to the single insert pocket and comprising:

an insert base surface abutting the base jaw;

an upwardly facing rake surface located above the insert base surface;

an insert second surface abutting the second jaw;

a forwardmost clearance surface extending downwardly from the rake surface; and a forwardmost cutting edge formed at an intersection of the rake surface and the forwardmost clearance surface; and a holder comprising:

a holder head portion comprising an adaptor pocket to which the adaptor shank portion is secured; and a holder shank portion connected to the holder head portion, and comprising:

a holder shank axis extending through the center of the holder shank and extending parallel with the upward and downward directions;

a holder shank cross-sectional shape extending perpendicular to the holder shank axis;

a forwardmost holder shank surface; and an imaginary line extending in the upward direction from the forwardmost holder shank surface;

wherein:

the holder shank cross-sectional shape is square or rectangular, the forwardmost cutting edge is directly above the forwardmost holder shank surface, and the forwardmost base jaw surface is within a tolerance distance DT of 2 mm from the imaginary line; or the holder shank cross-sectional shape is round, the holder shank axis extends to the forwardmost cutting edge and the forwardmost base jaw surface is within a tolerance distance DT of 2 mm from the holder shank axis.

* * * * *